US010625565B2

(12) United States Patent
Fukuda

(10) Patent No.: US 10,625,565 B2
(45) Date of Patent: Apr. 21, 2020

(54) VEHICLE SEAT

(71) Applicant: TOYOTA BOSHOKU KABUSHIKI KAISHA, Aichi (JP)

(72) Inventor: Tomokazu Fukuda, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 50 days.

(21) Appl. No.: 15/911,599

(22) Filed: Mar. 5, 2018

(65) Prior Publication Data

US 2018/0251004 A1 Sep. 6, 2018

(30) Foreign Application Priority Data

Mar. 3, 2017 (JP) .................................. 2017-040581

(51) Int. Cl.
*B60H 1/00* (2006.01)
*B60N 2/56* (2006.01)

(52) U.S. Cl.
CPC ....... *B60H 1/00521* (2013.01); *B60H 1/0055* (2013.01); *B60N 2/565* (2013.01); *B60H 2001/006* (2013.01)

(58) Field of Classification Search
CPC ... B60H 1/00521; B60H 1/0055; B60N 2/565
USPC .... 297/180.14, 452.42, 296, 452.14, 452.55, 297/284.4, 216.13, 284.2, 284.3, 452.56
See application file for complete search history.

(56) References Cited

U.S. PATENT DOCUMENTS

| | | | | |
|---|---|---|---|---|
| 6,712,427 B1* | 3/2004 | Bourdkane | ............ | A47C 7/465 297/284.4 |
| 7,290,837 B2* | 11/2007 | Sugiyama | ................ | B60N 2/66 297/284.4 |
| 7,393,054 B2* | 7/2008 | McQueen | ............... | A47C 7/465 297/284.4 |
| 7,607,739 B2* | 10/2009 | Browne | ................ | B60N 2/5621 297/180.1 |
| 8,360,522 B2* | 1/2013 | Akutsu | ............... | B60N 2/42781 297/284.4 |
| 8,590,979 B2* | 11/2013 | Matsumoto | ........... | B60N 2/4228 297/216.13 |
| 8,632,126 B2* | 1/2014 | Nitsuma | ............... | B60N 2/4228 297/216.13 |
| 8,651,575 B2* | 2/2014 | Okamoto | ................. | B60N 2/66 297/284.4 |

(Continued)

FOREIGN PATENT DOCUMENTS

JP 2015-209062 11/2015

*Primary Examiner* — Syed A Islam
(74) *Attorney, Agent, or Firm* — Greenblum & Bernstein, P.L.C.

(57) ABSTRACT

A vehicle seat includes a plate provided on a seatback, an attachment mounted on the plate, two wires extending substantially in an up-down direction to receive a load in a seat front-rear direction applied to the plate, and two locking fixing portions provided above a location of a combined center of gravity of the plate and the attachment to lock and fix the plate with the two wires. Each of the two locking fixing portions includes a first holding portion, a second holding portion, and a wall portion. The first holding portion and the second holding portion hold the corresponding wire in the seat front-rear direction. The wall portion contacts the corresponding wire from a side opposite to the attachment across the wire. The two locking fixing portions are open on the attachment sides.

18 Claims, 9 Drawing Sheets

(56) References Cited

U.S. PATENT DOCUMENTS

| | | | | |
|---|---|---|---|---|
| 8,752,892 B2* | 6/2014 | Sahashi | ............... | B60N 2/5635 |
| | | | | 297/180.13 |
| 8,998,311 B2* | 4/2015 | Axakov | ............... | B60N 2/5635 |
| | | | | 297/180.13 |
| 9,193,288 B2* | 11/2015 | Suzuki | ..................... | B60N 2/66 |
| 9,796,307 B2* | 10/2017 | Awatani | ............... | B60N 2/5635 |
| 10,293,720 B2* | 5/2019 | Okimura | .................. | B60N 2/90 |
| 10,322,653 B2* | 6/2019 | Takazaki | ............. | B60N 2/5642 |
| 2004/0113472 A1* | 6/2004 | McMillen | ............... | B60N 2/80 |
| | | | | 297/284.4 |
| 2006/0087160 A1* | 4/2006 | Dong | ....................... | A47C 7/72 |
| | | | | 297/180.13 |
| 2006/0232114 A1* | 10/2006 | Sugiyama | ............... | B60N 2/66 |
| | | | | 297/284.4 |
| 2009/0102270 A1* | 4/2009 | Wissner | ................... | B60N 2/68 |
| | | | | 297/452.56 |
| 2014/0203599 A1* | 7/2014 | Line | .................... | B60N 2/5642 |
| | | | | 297/180.14 |
| 2015/0306999 A1 | 10/2015 | Awatani | | |
| 2016/0121761 A1* | 5/2016 | Nishide | ............... | B60N 2/2222 |
| | | | | 297/284.3 |

* cited by examiner

VEHICLE SEAT

CROSS-REFERENCE TO RELATED APPLICATIONS

This application claims the benefit of Japanese Patent Application No. 2017-040581 filed on Mar. 3, 2017 with the Japan Patent Office, the entire disclosure of which is incorporated herein by reference.

BACKGROUND

The present disclosure relates to a vehicle seat mounted on a vehicle.

For example, a vehicle seat according to Japanese Unexamined Patent Application Publication No. 2015-209062 includes a blower for ventilation mounted on a resin plate provided in a seatback. The blower is a fan for a seat ventilation system that generates airflow on a surface of the seatback to promote ventilation of the surface of the seatback.

SUMMARY

When forced displacement such as vehicle vibration is applied to the plate, it is possible that the plate vibrates with a large amplitude since the blower has a mass larger than the plate. If the plate vibrates largely, the plate or the blower may periodically collide with the surroundings thereof, and generate abnormal noise.

The present disclosure provides a vehicle seat that can suppress abnormal noise caused by vibration of a plate mounting "an article having a mass larger than the plate (hereinafter referred to as attachment)", such as a blower or the like.

A vehicle seat includes a plate, an attachment mounted on the plate, two wires, each provided on one side in a seat width direction across the attachment, and two locking fixing portions provided above a location of a combined center of gravity of the plate and the attachment. The two wires extend substantially in an up-down direction and receives a load in a seat front-rear direction applied to the plate. The two locking fixing portions lock and fix the plate to the two respective wires.

Each of the two locking fixing portions includes a first holding portion, a second holding portion, and a wall portion. The first holding portion and the second holding portion hold the corresponding wire from the seat front-rear direction. The wall portion contacts the corresponding wire from a side opposite to the attachment across the wire. The two locking fixing portions are open on the attachment sides.

That is, in the present disclosure, the location of the combined center of gravity of the plate and the attachment is above a center of gravity of the plate. Since an exciting force generated by forced displacement of a vehicle is input to the plate or the like from a lower side of the seatback, there is a high possibility that an upper end portion of the plate vibrates with a large amplitude.

In contrast, the two locking fixing portions are provided above the location of the combined center of gravity of the plate and the attachment, and lock and fix the plate to the two respective wires, in the present disclosure. Thus, it is possible to reliably suppress vibration of the upper side of the plate with a large amplitude.

Each of the locking fixing portions has the first holding portion and the second holding portion, and the first holding portion and the second holding portion hold the corresponding wire from the seat front-rear direction. Thus, even if the plate vibrates in the seat front-rear direction, it is possible to reliably lock and fix the wires and the plate.

Each of the two locking fixing portions has the wall portion that contacts the corresponding wire from the side opposite to the attachment across the wire, that is, from an outer side in the seat width direction. Therefore, the wire and the plate can be reliably locked and fixed with each other even if the plate vibrates in the seat width direction.

Thus, since vibration of the plate at a large amplitude can be suppressed, it is possible to suppress abnormal noise caused by the vibration, and securely lock and fix the plate and the wires.

The present disclosure may be configured as follows.

Assume that the locking fixing portions are first locking fixing portions. Two second locking fixing portions that lock and fix the plate to the two respective wires may be provided below the location of the combined center of gravity of the plate and the attachment.

Each of the two second locking fixing portions has a first holding portion, second holding portions, and a wall portion. The first holding portion and the second holding portions hold the corresponding wire from the seat front-rear direction. The wall portion contacts the corresponding wire from the attachment side. The two second locking fixing portions are open on the sides opposite to the attachment.

That is, the wall portion of each of the second locking fixing portions contacts the corresponding wire from an inner side of the seat width direction. Therefore, if a load in the seat front-rear direction is applied to a center portion in a width direction of the plate and the plate is bent in a load direction, the wall portion of each of the second locking fixing portions is pressed against the corresponding wire.

In other words, when a load in the seat front-rear direction is applied to the center portion in the width direction of the plate, contact surface pressure between the wall portion of the second locking fixing portion and the wire increases. Therefore, when the load is applied, it becomes difficult for the second locking fixing portions to be detached from the respective wires.

If a portion of each wire to which the corresponding second locking fixing portion is fixed is inclined with respect to the up-down direction, an assembly operator can lock and fix the second locking fixing portion easily to the wire by fitting the second locking fixing portion downward from above the wire.

Further, the assembly operator can lock and fix each of the first locking fixing portions easily to the wire by fitting the first locking fixing portion from outside of the corresponding wire. Therefore, assembling workability of the plate can be improved.

BRIEF DESCRIPTION OF THE DRAWINGS

An example embodiment of the present disclosure will be described hereinafter by way of example with reference to the accompanying drawings, in which.

DETAILED DESCRIPTION OF THE PREFERRED EMBODIMENTS

Arrows and the like indicating directions attached to respective figures are provided in order to facilitate easy understanding of the relationship between the figures. The present disclosure is not limited to the directions attached to the respective figures.

1. Outline of Vehicle Seat

Figure 1:
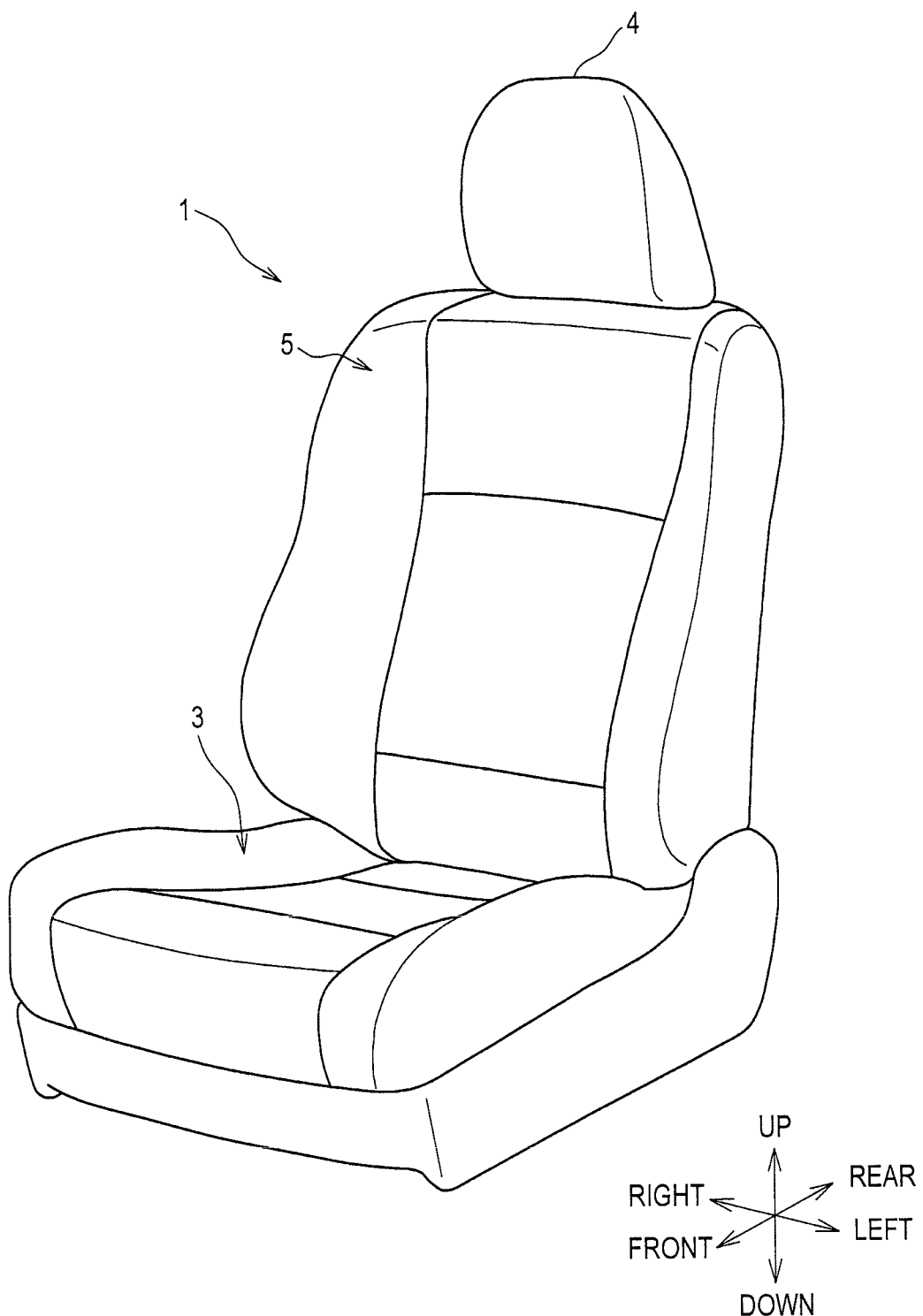
FIG. 1 is a perspective view of a vehicle seat according to an embodiment.

As shown in FIG. 1, a vehicle seat 1 includes a seat cushion 3, a seatback 5, and the like.

The seat cushion 3 is a member for supporting the buttocks and the like of a seat occupant. The seatback 5 is a member for supporting the back of the seat occupant. The seatback 5 can swing (be reclined) in a seat front-rear direction with respect to the seat cushion 3.

Figure 2:
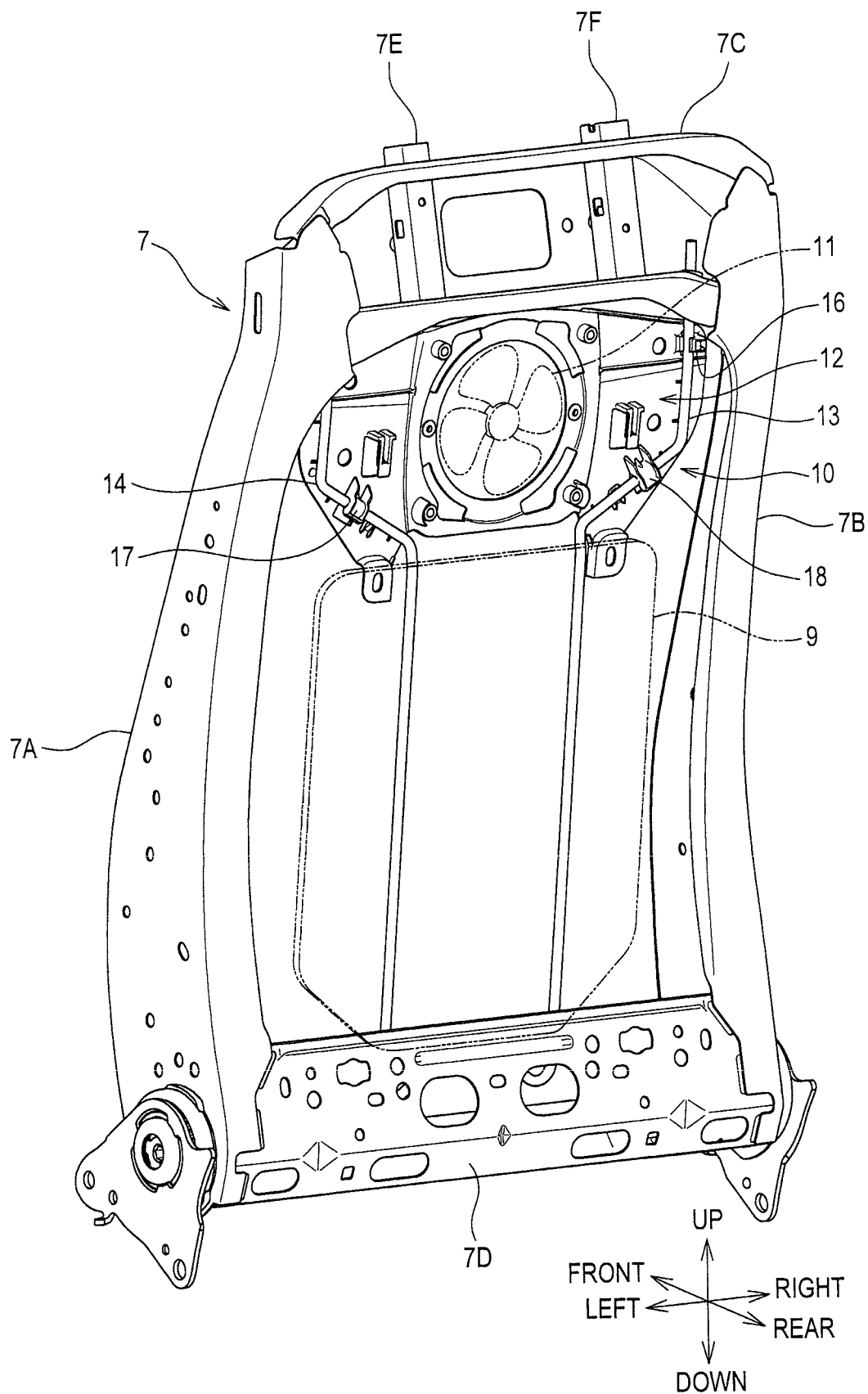
FIG. 2 is a rear perspective view of a back frame employed in the vehicle seat according to the embodiment.

A back frame 7 shown in FIG. 2 forms a frame of the seatback 5. The back frame 7 is swingably coupled to a cushion frame (not shown). The cushion frame forms a frame of the seat cushion 3.

The back frame 7 has a left side frame 7A, a right side frame 7B, an upper panel 7C, a lower panel 7D, and so on. Each of the side frames 7A, 7B extends in a substantially up-down direction, and is arranged on one side in a seat width direction of the back frame 7.

The upper panel 7C extends in the seat width direction, and couples upper ends of the side frames 7A, 7B. The lower panel 7D extends in the seat width direction, and couples lower ends of the side frames 7A, 7B.

Two headrest supports 7E, 7F are fixed to the upper panel 7C. The two headrest supports 7E, 7F are members for supporting a headrest 4 (see FIG. 1). The headrest 4 is a member for supporting the head of the seat occupant.

2. Seat Ventilation System (SVS)

As shown in FIG. 2, the vehicle seat 1 according to the present embodiment is provided with a seat ventilation system 10. The seat ventilation system 10 promotes ventilation of a surface of the vehicle seat 1 so as to provide a cool feeling to the seat occupant.

The seat ventilation system 10 has a blower 11 accommodated in the seatback 5. The blower 11 generates airflow on a surface of the seatback 5.

FIG. 2 shows an axial flow fan as the blower 11. However, the actual blower 11 may be a centrifugal fan. The blower 11 sucks air from the surface of the seatback 5 and discharges the sucked air downward.

The blower 11 is attached to a plate 12. That is, the blower 11 is an example of an attachment mounted on the plate 12. The plate 12 is a plate-shaped member made of resin. The plate 12 is fixed to the back frame 7 through two wires 13, 14 (left wire 14 and right wire 13).

Figure 3:
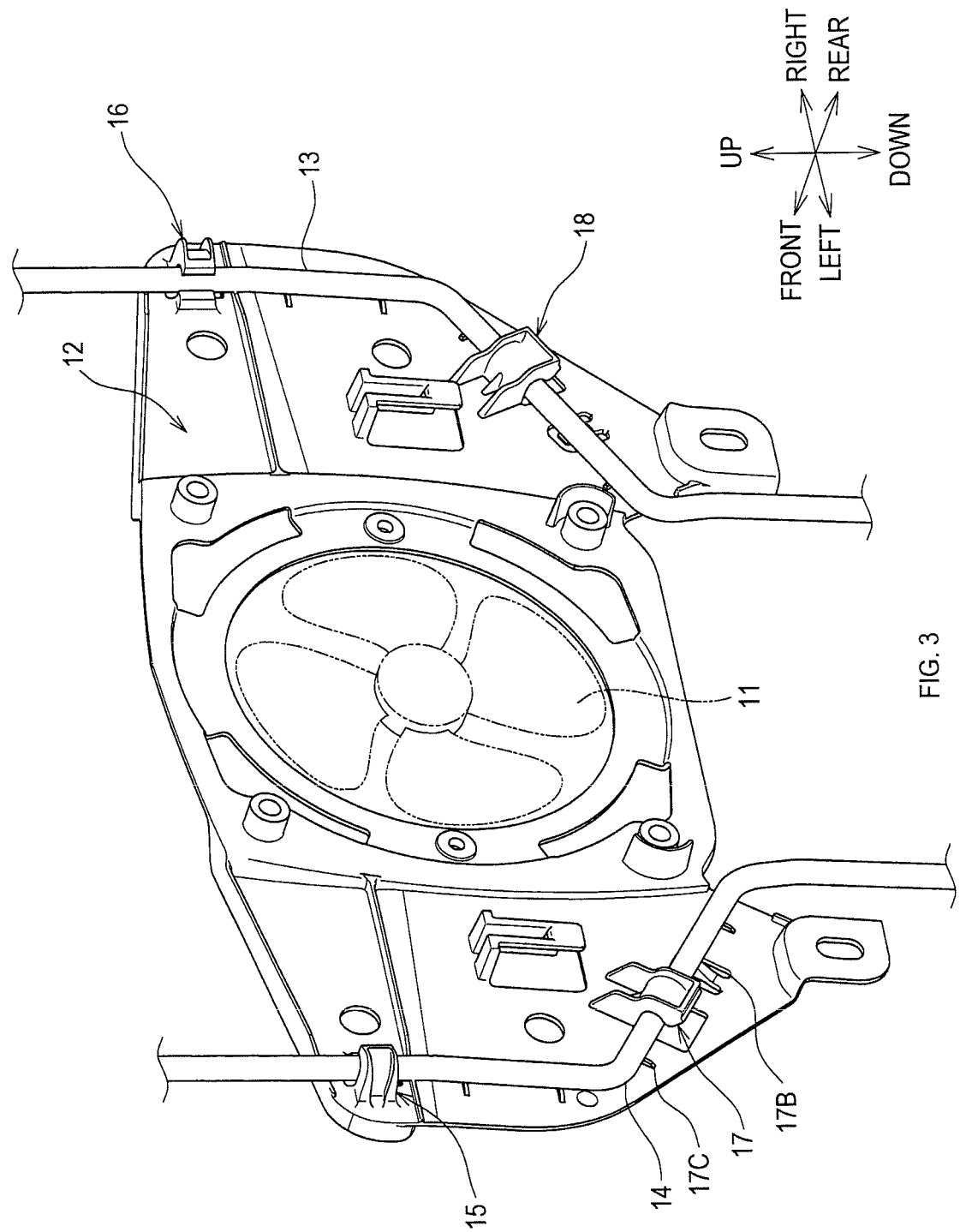
FIG. 3 is a diagram showing an assembled state of a plate, two wires, and so on according to the embodiment.

As shown in FIG. 3, each of the two wires 13, 14 is provided on one side in the seat width direction across the blower 11. Each of the wires 13, 14 extends in the substantially up-down direction and receives a load in the seat front-rear direction applied to the plate 12. The two wires 13, 14 are made of metal, each having a shape of a solid round bar.

Each of the two wires 13, 14, as shown in FIG. 2, is curved at a portion corresponding to a lower end of the plate 12 so as to avoid interference with the fan 11. A lumbar support plate 9 for supporting the waist of the seat occupant is attached below the curved portions of the two wires 13, 14.

3. Plate Fixing Structure

Figure 4:
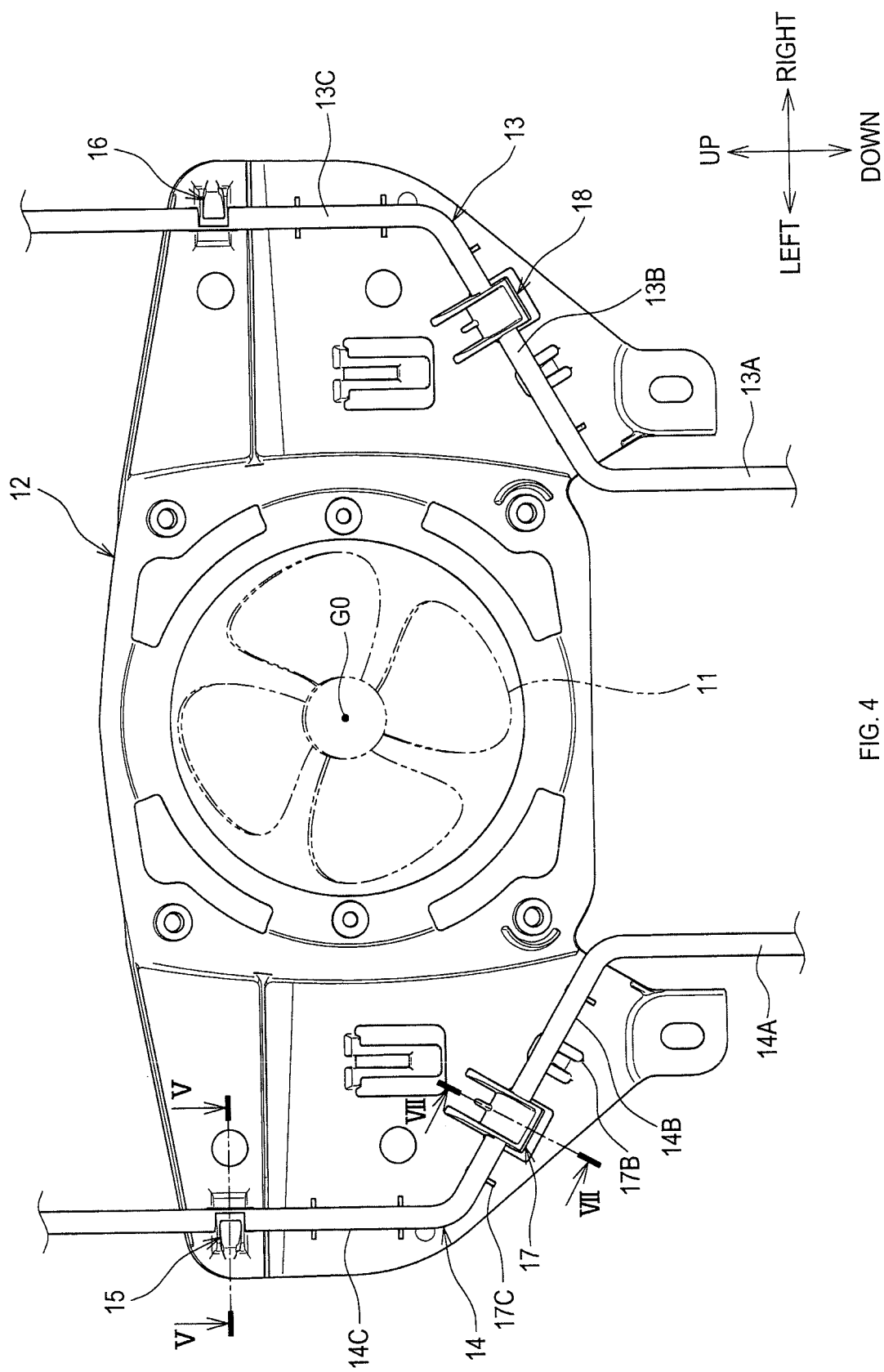
FIG. 4 is a diagram showing an assembled state of the plate, the two wires, and so on according to the embodiment.

The plate 12, as shown in FIG. 4, is locked and fixed to the wires 13, 14 by two first locking fixing portions 15, 16 respectively (left first locking fixing portion 15 and right first locking fixing portion 16) and by the two second locking fixing portions 17, 18, respectively (left second locking fixing portion 17 and right second locking fixing portion 18). The first locking fixing portion 15 and the second locking fixing portion 17, and the first locking fixing portion 16 and the second locking fixing portion 18, have a symmetrical structure. These locking fixing portions 15-18 are also known as "locks," specifically: a top left lock 15, a top right lock 16, a lower left lock 17, and a lower right lock 18.

Each of the locking fixing portions (or "locks") 15-18 is integrally molded with resin together with the plate 12 (that is, a single piece). The two first locking fixing portions 15, 16 are provided above a location of a combined center of gravity GO of the plate 12 and the blower 11. In the present embodiment, the location of the combined center of gravity GO approximately lies on an axis of rotation of the blower 11.

FIG. 4 also illustrates various portions of the left wire 14: a lower vertical portion 14A, a middle angled portion 14B, and an upper vertical portion 14C.

<First Locking Fixing Portion>

Figure 5:
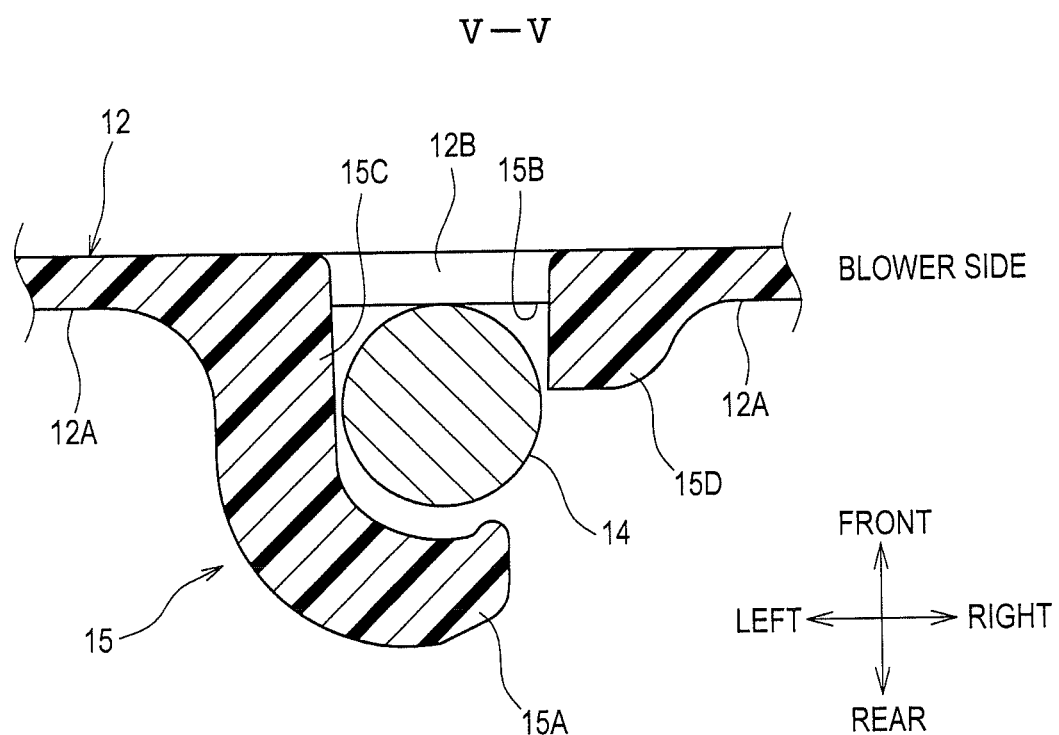
FIG. 5 is a cross-sectional view taken along a line V-V in FIG. 4.

As shown in FIG. 5, the first locking fixing portion 15 has a first holding portion 15A, a second holding portion 15B, a wall portion 15C, and a protrusion 15D. The first holding portion 15A and the second holding portion 15B are members that hold the wire 14 from the seat front-rear direction (that prevent the wire 14 from moving in the front-rear direction).

The wall portion 15C contacts the wire 14 from a side opposite to the blower 11 across the wire 14. In other words, the wall portion 15C contacts a left side (a non-blower side) of the wire 14. A member corresponding to the wall portion 15C is not provided on the blower side (the right side) of the wire 14. That is, the first locking fixing portion 15 is configured to be open on the blower side (on the right side, which faces the blower 11). Plate 12 includes a plate surface 12A and a through hole 12B.

Figure 6:
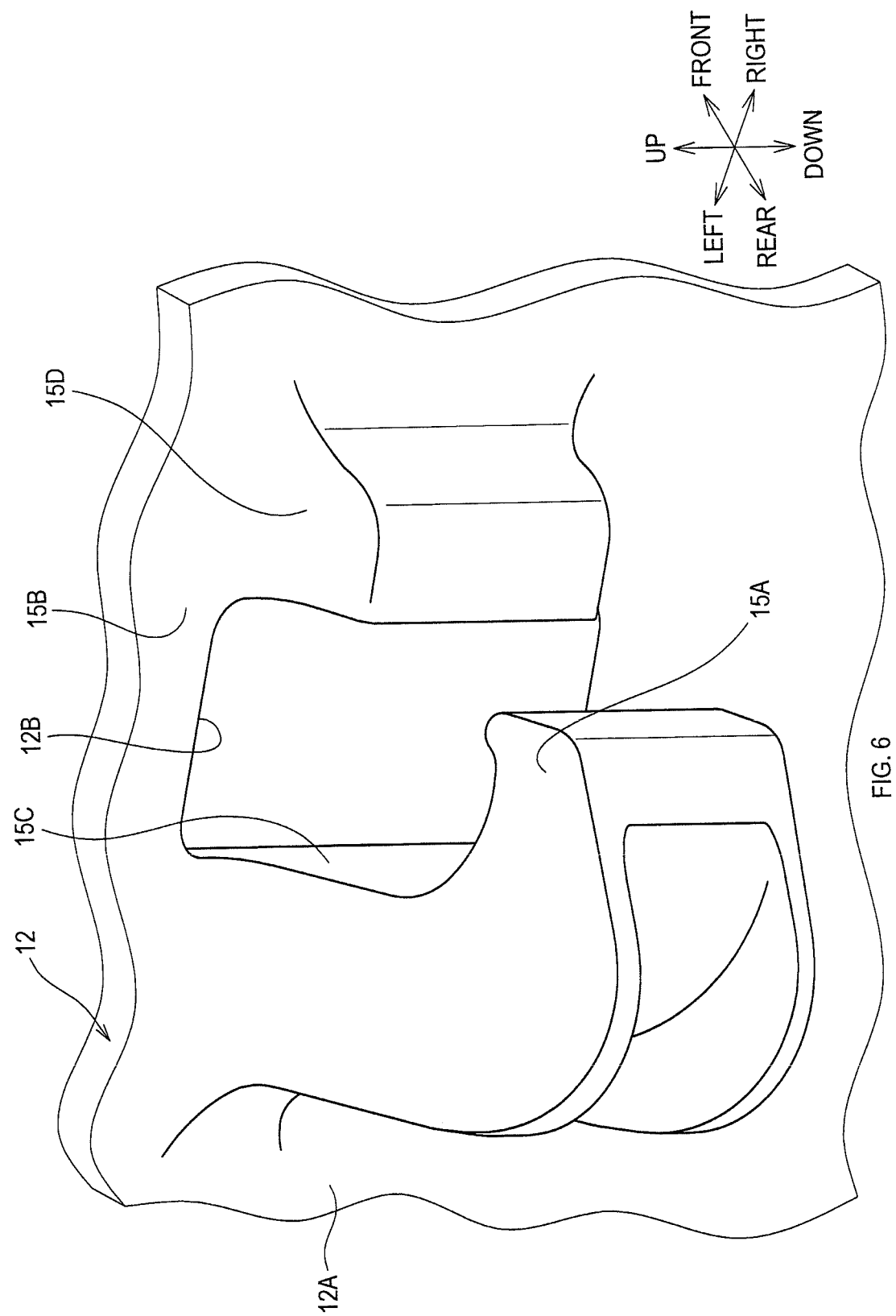
FIG. 6 is an enlarged view of a first locking fixing portion according to the embodiment.

As shown in FIG. 6, the wall portion 15C protrudes from the plate surface 12A of the plate 12 in the seat front-rear direction (in the present embodiment, to a rear side of the seat). The first holding portion 15A protrudes from a leading end in a protruding direction of the wall portion 15C to the blower side.

The wall portion 15C and the first holding portion 15A form a substantially L-shaped protrusion. The second holding portion 15B is formed by the plate surface 12A of the plate 12 in areas where the through hole 12B is not present. The first holding portion 15A, the second holding portion 15B, and the wall portion 15C (and the protrusion 15D) are integrally molded together with resin.

When the wire 14 is held by the first holding portion 15A and the second holding portion 15B, at least the first holding portion 15A is elastically deformed. A restoring force generated by the elastic deformation of the first holding portion 15A is at least a part of a force holding the wire 14, and pushes wire 14 rightward towards the blower 11.

The through hole 12B penetrating the plate 12 is provided in a portion of the plate 12 displaced from the first holding portion 15A toward the plate surface 12A. The through hole 12B is a drain hole for a mold for resin molding the wall portion 15C and the first holding portion 15A (the plate 12 is molded with the plate surface 12A in a horizontal orientation). Therefore, the second holding portion 15B is configured by a portion on both sides of the plate surface 12A across the through hole 12B. In other words, the second holding portion 15B is an area of plate surface 12A above through hole 12B, and below through hole 12B, which wire 14 will contact.

The protrusion 15D suppresses escape of the wire 14 from the first locking fixing portion 15. The protrusion 15D is integrally molded with resin together with the plate 12. Since the first locking fixing portion 16 has a symmetrical structure (a mirror image) with the first locking fixing portion 15, a detailed description thereof is omitted. However, note that the wall portion (not shown) of the right first locking fixing portion 16 elastically pushes wire 13 towards the blower 11, similar to (mirror image of) the left first locking fixing portion 15.

<Second Locking Fixing Portion>

Figure 7:
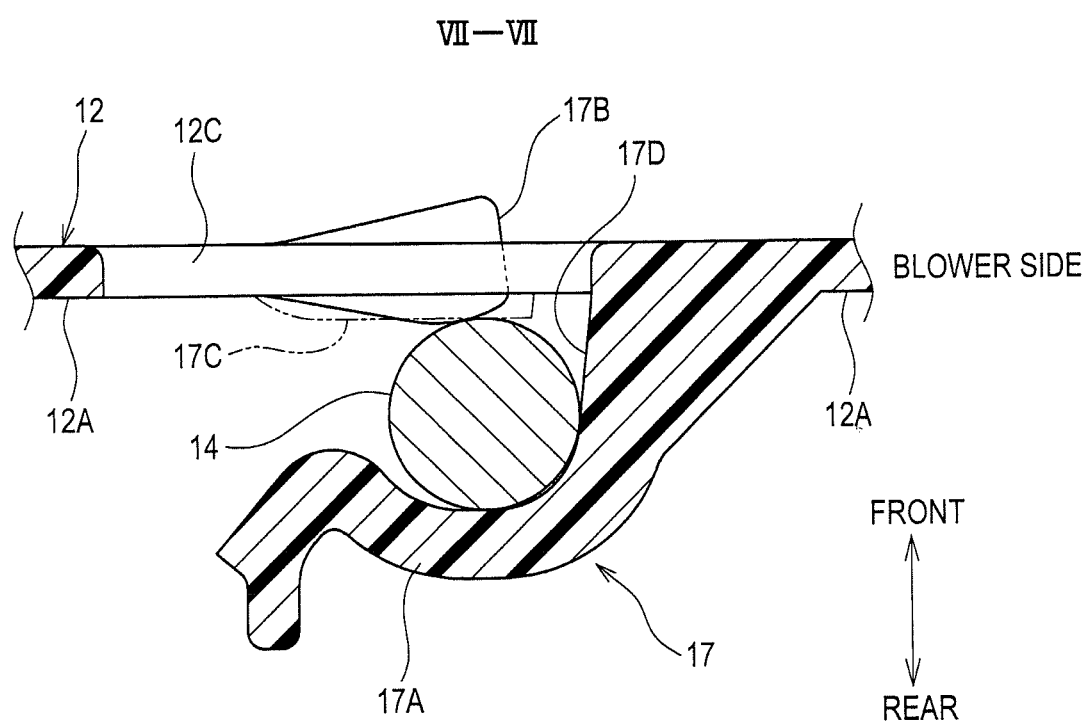
FIG. 7 is a cross-sectional view taken along a line VII-VII in FIG. 4.

As shown in FIG. 7, the second locking fixing portion 17 includes a first holding portion 17A, second holding portions 17B, 17C (lower second holding portion 17B and upper second holding portion 17C), a wall portion 17D, and the like. The first holding portion 17A pushes the wire 14 in a forward direction. The second holding portions 17B, 17C push the wire 14 in a rear direction.

The wall portion 17D contacts the wire 14 from the same side as the blower 11 across the wire 14. No member corresponding to the wall portion 17D is provided on a side opposite to the blower 11 across the wire 14. In other words, the second locking fixing portion 17 is configured to be open on the side opposite to the blower 11.

Figure 8:
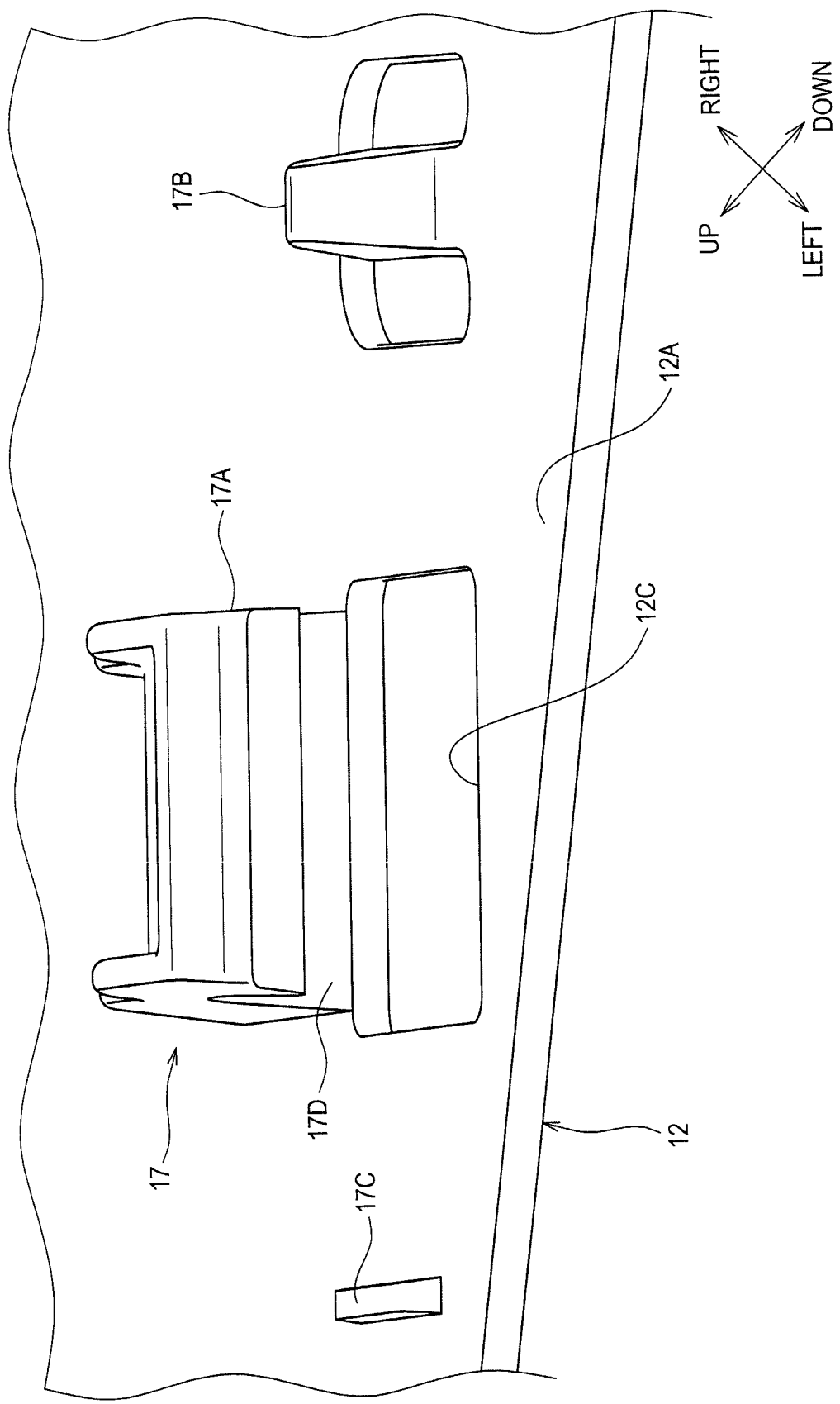
FIG. 8 is an enlarged view of a second locking fixing portion according to the embodiment.

As shown in FIG. 8, the wall portion 17D protrudes from the plate surface 12A of the plate 12 in the seat front-rear direction (in this embodiment, to the rear side of the seat). The first holding portion 17A protrudes from a leading end in a protruding direction of the wall portion 17D to the side opposite to the blower 11.

The wall portion 17D and the first holding portion 17A form a substantially L-shaped protrusion. The second holding portions 17B, 17C (lower second holding portion 17B and upper second holding portion 17C) are provided on the plate surface 12A of the plate 12. The second holding portion 17B is elastically displaceable in a thickness direction of the plate surface 12A.

Figure 9:
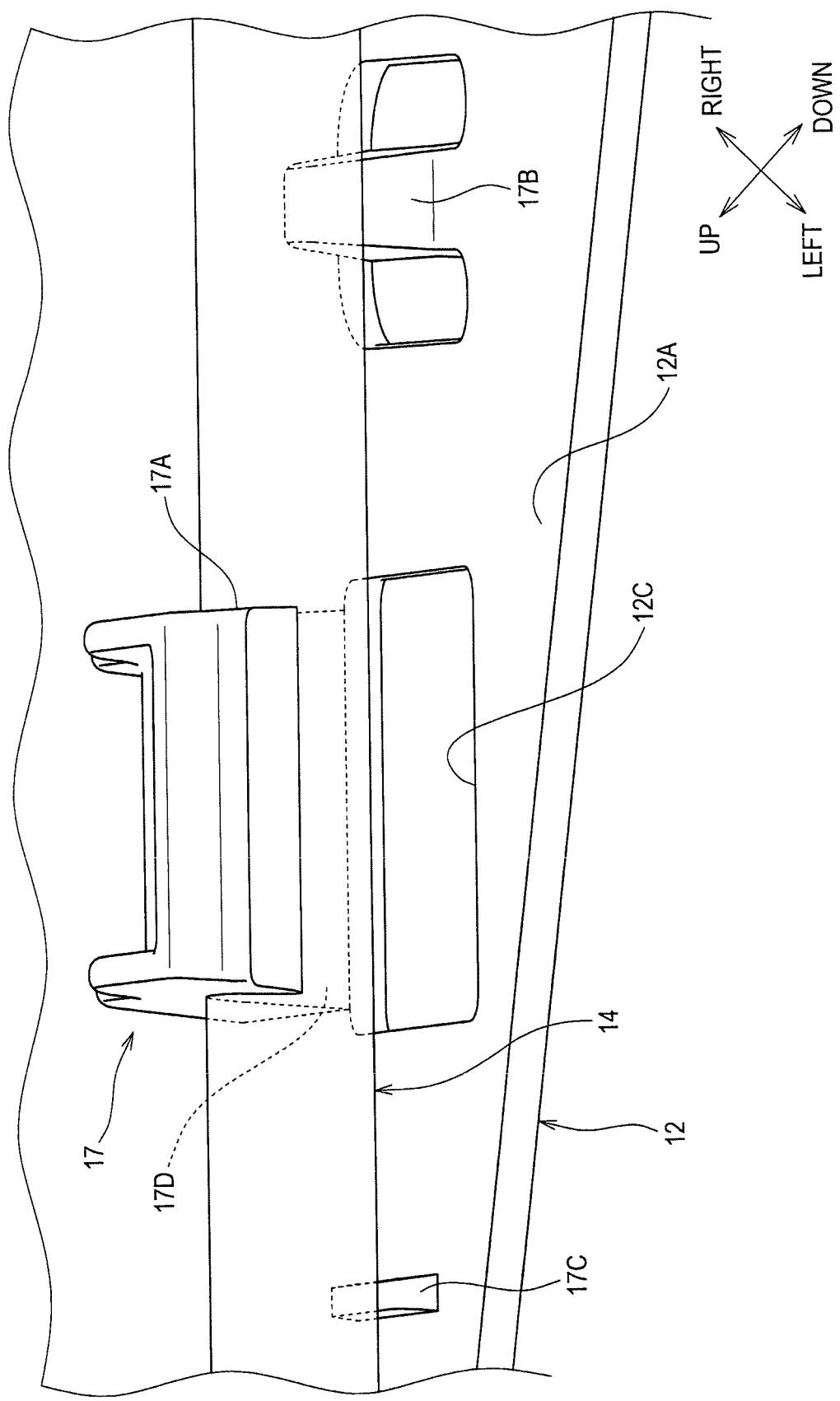
FIG. 9 is a view showing a state in which the wire is held by the second locking fixing portion according to the embodiment.

The second holding portion 17C is a protrusion protruding from the plate surface 12A. In a state in which the wire 14 is locked and fixed to the second locking fixing portion 17, the wire 14 is elastically held between first holding portion 17A and the second holding portions 17B, 17C, as shown in FIG. 9.

In a state in which the wire 14 is held by the second locking fixing portion 17, at least the first holding portion 17A is elastically deformed and the second holding portion 17B is elastically deformed in a direction opposite to the protruding direction of the wall portion 17D, as shown in FIG. 7. That is, the elastic deformation of the first holding portion 17A and the second holding portion 17B provides opposing forces to hold the wire 14.

The first holding portion 17A, the second holding portions 17B, 17C and the wall portion 17 are integrally molded with resin together with the plate 12. As shown in FIG. 8, a through hole 12C penetrating the plate 12 is provided in a portion of the plate 12 displaced from the first holding portion 17A toward the plate surface 12A.

The through hole 12C is a drain hole for a mold for resin molding the wall portion 17D and the first holding portion 17A. Since the second locking fixing portion 18 has a symmetrical structure with (is a mirror image of) the second locking fixing portion 17, a detailed description thereof is omitted.

3. Characteristics of Vehicle Seat According to Present Embodiment

In the present embodiment, the location of the combined center of gravity GO of the plate 12 and the blower 11 is above a center of gravity (not shown) of the plate 12. Since an exciting force generated by forced displacement of the vehicle is input to the plate 12 or the like from a lower side of the seatback 5, there is a high possibility that an upper end portion of the plate 12 vibrates with a large amplitude.

In contrast, in the present embodiment, the two first locking fixing portions 15, 16, which are provided above the location of the combined center of gravity GO of the plate 12 and the blower 11, lock and fix the plate 12 to the two wires 13, 14, respectively. Thus, it is possible to reliably suppress vibration of the upper end portion of the plate 12 with a large amplitude.

Each of the two first locking fixing portions 15, 16 includes the first holding portion 15A and the second holding portion 15B that hold the corresponding wire 13, 14 from the seat front-rear direction. Thus, the two first locking fixing portions 15, 16 can securely lock and fix the two wires 13, 14 to the plate 12 even if the plate 12 vibrates in the seat front-rear direction.

Each of the two first locking fixing portions 15, 16 includes the wall portion 15C that contacts the corresponding wire 13, 14 from the side opposite to the blower 11 across the wire 13, 14, i.e. from outside in the seat width direction. Thus, the two wires 13, 14 and the plate 12 can be securely locked and fixed with each other even if the plate 12 vibrates in the seat width direction.

Therefore, since vibration of the plate 12 at a large amplitude can be suppressed, generation of abnormal noise due to the vibration can be suppressed and the plate 12 and the two wires 13, 14 can be reliably locked and fixed with each other.

The two second locking fixing sections 17, 18 that lock and fix the plate 12 to the two respective wires 13, 14 are provided below the location of the combined center of gravity GO of the plate 12 and the blower 11.

Each of the two second locking fixing portions 17, 18 includes the first holding portion 17A and the second holding portions 17B, 17C that hold the corresponding wire 13, 14 from the seat front-rear direction, as well as the wall portion 17D that contacts the corresponding wire 13, 14 from the blower 11 side.

That is, the wall portions 17D of the two second locking fixing portions 17, 18 contact the two respective wires 13, 14 from inside in the seat width direction. Therefore, if a load in the seat front-rear direction is applied to the center portion in the width direction of the plate 12 and bends the plate 12 in a load direction, the walls portions 17D of the two second locking fixing portions 17, 18 are pressed against the two respective wires 13, 14.

In other words, if the load in the seat front-rear direction is applied to the center portion in the width direction of the plate 12, contact surface pressures between the wall portions 17D of the second locking fixing portions 17, 18 and the respective wires 13, 14 increase. Therefore, when the load is applied, it becomes difficult for the second locking fixing portions 17, 18 to be detached from the wires 13, 14.

In the present embodiment, portions of the two wires 13, 14 to which the two second locking fixing portions 17, 18 are respectively fixed are inclined with respect to the up-down direction. In such configuration, an assembly operator can easily lock and fix the second locking fixing portions 17, 18 to the wires 13, 14 by fitting the second locking fixing portions 17, 18 downward from above the two wires 13, 14.

Furthermore, the assembly operator can easily lock and fix the two first locking fixing portions 15, 16 to the two wires 13, 14 by fitting the two first locking fixing portions 15, 16 from outside of the two wires 13, 14. Therefore, assembling workability of the plate 12 can be improved.

OTHER EMBODIMENTS

The above embodiment describes the blower 11 as an example of an attachment. However, the present disclosure is not limited to such configuration. For example, an article like a speaker or the like, having a larger mass than the plate 12 may be an attachment.

In the above embodiment, the two wires 13, 14 are curved at the lower end of the plate 12. However, the present disclosure is not limited to such configuration. For example, the two wires may extend in the up-down direction without being curved.

In the above embodiment, the two wires 13, 14 are locked and fixed to the plate 12 by the two first locking fixing portions 15, 16 and the two second locking fixing portions 17, 18. However, the present disclosure is not limited to such configuration. For example, third locking fixing portions may be provided between the two first locking fixing portions 15, 16 and the two second locking fixing portions 17, 18.

In the above embodiment, the two first locking fixing portions 15, 16 and the two second locking fixing portion 17, 18 are integrally formed with the plate 12, but the present disclosure is not limited to such configuration.

In the above embodiment, the blower 11 sucks air from the surface of the seatback 5. The present disclosure is not limited to such configuration. For example, the blower 11 may blow air to the surface of the seatback 5.

The above embodiment describes an example of a front seat of a vehicle. However, the present disclosure is not limited to such configuration. The present disclosure can be applied also to other vehicle seats, or seats for use in vehicles such as railway vehicles, ships and aircrafts.

The present disclosure is not limited to the embodiments described above and may be embodied in any ways without departing from the gist of the invention in the claims. Therefore, at least two of the above-described embodiments may be combined.

What is claimed is:

1. A vehicle seat mounted on a vehicle, the seat having a seatback for supporting a back of a seat occupant, the seat comprising:
    a plate provided on the seatback;
    an attachment mounted on the plate;
    two wires, each provided on a respective side in a seat width direction across the attachment, the two wires extending substantially in an up-down direction and receiving a load in a seat front-rear direction applied to the plate; and
    two locking fixing portions provided above a location of a combined center of gravity of the plate and the attachment, and locking and fixing the plate to the respective two wires, the two locking fixing portions each including a first holding portion and a second holding portion that hold a corresponding wire of the two wires from the seat front-rear direction, and a wall portion that contacts the corresponding wire from a side opposite to the attachment across the wire, the wall portion elastically pushing the corresponding wire toward the attachment, and the two locking fixing portions each being open on an attachment side.

2. The vehicle seat according to claim 1,
    wherein the two locking fixing portions are first locking fixing portions,
    wherein the vehicle seat further comprises two second locking fixing portions below the location of the combined center of gravity of the plate and the attachment, the two second locking fixing portions locking and fixing the plate to the respective two wires,
    wherein the two second locking fixing portions each include a first holding portion and second holding portions that hold the corresponding wire from the seat front-rear direction, and a wall portion that contacts the corresponding wire from the attachment side, the two second locking fixing portions each being open on a side facing away from the attachment.

3. The vehicle seat according to claim 2,
    wherein the two first locking fixing portions, the two second locking fixing portions, and the plate are integrally molded with resin.

4. The vehicle seat according to claim 1,
    wherein the attachment is a blower that generates airflow to a surface of the seatback.

5. A system applied to a seat, comprising:
    a plate shaped to hold an attachment in a central area of the plate;
    a top left lock shaped to hold an upper vertical portion of a left wire;
    a bottom left lock shaped to hold a middle angled portion of the left wire;
    a top right lock shaped to hold an upper vertical portion of a right wire; and
    a bottom right lock shaped to hold a middle angled portion of the right wire,
    wherein the top left lock and the top right lock are positioned on the plate.

6. The system of claim 5, wherein the top left lock and the top right lock are both located above a combined center of gravity of the plate and the attachment when the plate is in a substantially vertical position.

7. A system applied to a seat, comprising:
    a plate shaped to hold an attachment in a central area of the plate;
    a top left lock shaped to hold an upper vertical portion of a left wire;
    a bottom left lock shaped to hold a middle angled portion of the left wire;
    a top right lock shaped to hold an upper vertical portion of a right wire; and
    a bottom right lock shaped to hold a middle angled portion of the right wire,
    wherein the bottom left lock and the bottom right lock are positioned on the plate such that the bottom left lock and the bottom right lock are both located below a combined center of gravity of the plate and the attachment when the plate is in the substantially vertical position.

8. The system of claim 7, wherein the top left lock is shaped to elastically push the upper vertical portion of the left wire rightward.

9. The system of claim 8, wherein the top left lock is substantially L-shaped and includes:
   a wall portion extending away from a plate surface and shaped to push the left wire rightward, and
   a first holding portion extending rightward from the wall portion and shaped to hold the left wire against the plate.

10. The system of claim 9, wherein the top left lock further includes:
   a protrusion protruding from the plate surface and shaped to press the left wire against the wall portion or against the first holding portion; and
   a through hole located in the plate between the wall portion and the protrusion.

11. The system of claim 10, wherein the top right lock is a mirror image of the top left lock.

12. The system of claim 7, wherein the top right lock is shaped to elastically push the middle angled portion of the left wire downwards and leftwards.

13. The system of claim 12, wherein the bottom left lock is substantially L-shaped and includes:
   a wall portion extending away from a plate surface, and
   a first holding portion extending leftwards and downwards and shaped to hold the left wire against the plate.

14. The system of claim 13, wherein the bottom left lock further includes:
   a through hole located in the plate surface and adjacent to the wall portion,
   an upper second holding portion located above and to the left of the wall portion, and
   a lower second holding portion located below and to the right of the wall portion.

15. The system of claim 14, wherein the upper second holding portion protrudes from the plate surface and is shaped to press the left wire away from the plate and against the first holding portion, and
   wherein the lower second holding portion protrudes from the plate surface and is shaped to press the left wire away from the plate and against the first holding portion.

16. The system of claim 15, wherein the lower second holding portion is larger than the upper second holding portion, and wherein the first holding portion is larger than the lower second holding portion.

17. The system of claim 16, wherein the bottom right lock is a mirror image of the bottom left lock.

18. The system of claim 5, wherein the attachment is a blower for a seat ventilation system (SVS), or the attachment is a speaker for a speaker system.

* * * * *